United States Patent
Lu

(10) Patent No.: US 9,019,832 B2
(45) Date of Patent: Apr. 28, 2015

(54) NETWORK SWITCHING SYSTEM AND METHOD FOR PROCESSING PACKET SWITCHING IN NETWORK SWITCHING SYSTEM

(71) Applicant: Ralink Technology Corp., Hsinchu (TW)

(72) Inventor: Kuo-Cheng Lu, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 141 days.

(21) Appl. No.: 13/802,838

(22) Filed: Mar. 14, 2013

(65) Prior Publication Data
US 2014/0269298 A1 Sep. 18, 2014

(51) Int. Cl.
*H04L 12/28* (2006.01)
*H04L 12/801* (2013.01)
*H04L 12/861* (2013.01)
*H04L 12/70* (2013.01)
*H04L 12/935* (2013.01)

(52) U.S. Cl.
CPC ............ *H04L 47/12* (2013.01); *H04L 49/90* (2013.01); *H04L 2012/5681* (2013.01); *H04L 49/3027* (2013.01)

(58) Field of Classification Search
CPC ............ H04L 49/3027; H04L 2012/5681; H04L 49/90
USPC .................................................. 370/412, 417
See application file for complete search history.

(56) References Cited

U.S. PATENT DOCUMENTS

| | | | |
|---|---|---|---|
| 6,229,789 B1 * | 5/2001 | Simpson et al. | 370/235 |
| 6,697,362 B1 * | 2/2004 | Akella et al. | 370/389 |
| 6,850,490 B1 * | 2/2005 | Woo et al. | 370/230 |
| 7,072,345 B2 * | 7/2006 | Siu et al. | 370/395.4 |
| 7,308,526 B2 * | 12/2007 | Lakshmanamurthy et al. | 711/104 |
| 7,426,572 B1 * | 9/2008 | Sindhu et al. | 709/238 |
| 2004/0205305 A1 * | 10/2004 | Lee et al. | 711/149 |
| 2004/0228340 A1 * | 11/2004 | Akella et al. | 370/386 |
| 2005/0089054 A1 * | 4/2005 | Ciancaglini et al. | 370/412 |
| 2005/0273564 A1 * | 12/2005 | Lakshmanamurthy et al. | 711/158 |
| 2007/0008985 A1 * | 1/2007 | Lakshmanamurthy et al. | 370/412 |
| 2007/0121499 A1 * | 5/2007 | Pal et al. | 370/230 |
| 2007/0239966 A1 * | 10/2007 | Georgiou et al. | 712/28 |
| 2007/0297437 A1 * | 12/2007 | Akella et al. | 370/428 |
| 2009/0268612 A1 * | 10/2009 | Felderman et al. | 370/230 |
| 2009/0307437 A1 * | 12/2009 | Lee et al. | 711/149 |
| 2012/0030306 A1 * | 2/2012 | Kami | 709/213 |
| 2012/0257501 A1 * | 10/2012 | Kucharczyk | 370/235 |

OTHER PUBLICATIONS

Iyer, Analysis of a Memory Architecture for Fast Packet Buffers, May 29-31, 2001.

* cited by examiner

*Primary Examiner* — Jay P Patel
(74) *Attorney, Agent, or Firm* — Winston Hsu; Scott Margo

(57) ABSTRACT

A network processor for processing packet switching in a network switching system is disclosed. The network processor includes a first memory for storing a first packet among a plurality of packets; a second memory for storing a second packet among the plurality of packets; and a memory selecting unit for selecting the first memory or the second memory for storing each of the plurality of packets according to whether a traffic of the network switching system is congested; wherein attributes of the first memory and the second memory are different.

18 Claims, 10 Drawing Sheets

| Policy sequence | SRAM_FFA | SRAM_Qi_Resv | DRAM_FFA | DRAM_Qi_Resv | Action |
|---|---|---|---|---|---|
| 1 | >0 | Any | Any | Any | Use SRAM |
| 2 | =0 | >0 | Any | Any | Use SRAM |
| 3 | =0 | =0 | >0 | Any | Use DRAM |
| 4 | =0 | =0 | =0 | >0 | Use DRAM |
| 5 | =0 | =0 | =0 | =0 | Pause port |

FIG. 7

NETWORK SWITCHING SYSTEM AND METHOD FOR PROCESSING PACKET SWITCHING IN NETWORK SWITCHING SYSTEM

BACKGROUND

The present invention relates to a network processor and method for processing packet switching in a network switching system, and more particularly, to a network processor and method capable of storing a packet to a designated memory according to a congestion status of a network switching system.

With the rapid development of wireless network technology, more and more network services such as wire-speed, Quality of Service (QoS), low power, virtual private network (VPN), storage, multicast, content scanning, firewall, etc. are required to be included in an access point (AP) or a router. In order to achieve these requirements, a network switching system may use a more powerful central processing unit (CPU), a larger Level 1 (L1) and Level 2 (L2) cache, and a faster random access memory (RAM). In recent years, a cost-effective solution that uses a hardware accelerator for accelerating data processing is provided, in order to offload these network services.

However, for packet switching between these heterogeneous network services and various network ports, the conventional network switching system may not perform packet switching efficiently and completely due to inherent limitation of the memory used in the network switching system, especially when the traffic of the network switching system is congested. Therefore, there is a need for improvement over the prior art.

SUMMARY

It is therefore an objective of the present invention to provide a network processor and method capable of storing a packet to a designated memory according to a congestion status of a network switching system.

The present invention discloses a network processor for processing packet switching in a network switching system. The network processor comprises a first memory for storing a first packet among a plurality of packets; a second memory for storing a second packet among the plurality of packets; and a memory selecting unit for selecting the first memory or the second memory for storing each of the plurality of packets according to whether a traffic of the network switching system is congested; wherein attributes of the first memory and the second memory are different.

The present invention further discloses a network switching system comprising a plurality of network ports and a network processor. Each of the plurality of network ports comprises a plurality of queues. The network processor comprises a first memory for storing a first packet among a plurality of packets; a second memory for storing a second packet among the plurality of packets; and a memory selecting unit for selecting the first memory or the second memory for storing each of the plurality of packets according to whether a traffic of the network switching system is congested; wherein attributes of the first memory and the second memory are different.

The present invention further discloses a method of processing packet switching in a network switching system, and the network switching system comprises a first memory and a second memory. The method comprises selecting the first memory or the second memory for storing each of a plurality of packets according to whether a traffic of the network switching system is congested; wherein attributes of the first memory and the second memory are different.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 is a schematic diagram of a selecting policy according to an example of the present invention.

DETAILED DESCRIPTION

Figure 1:
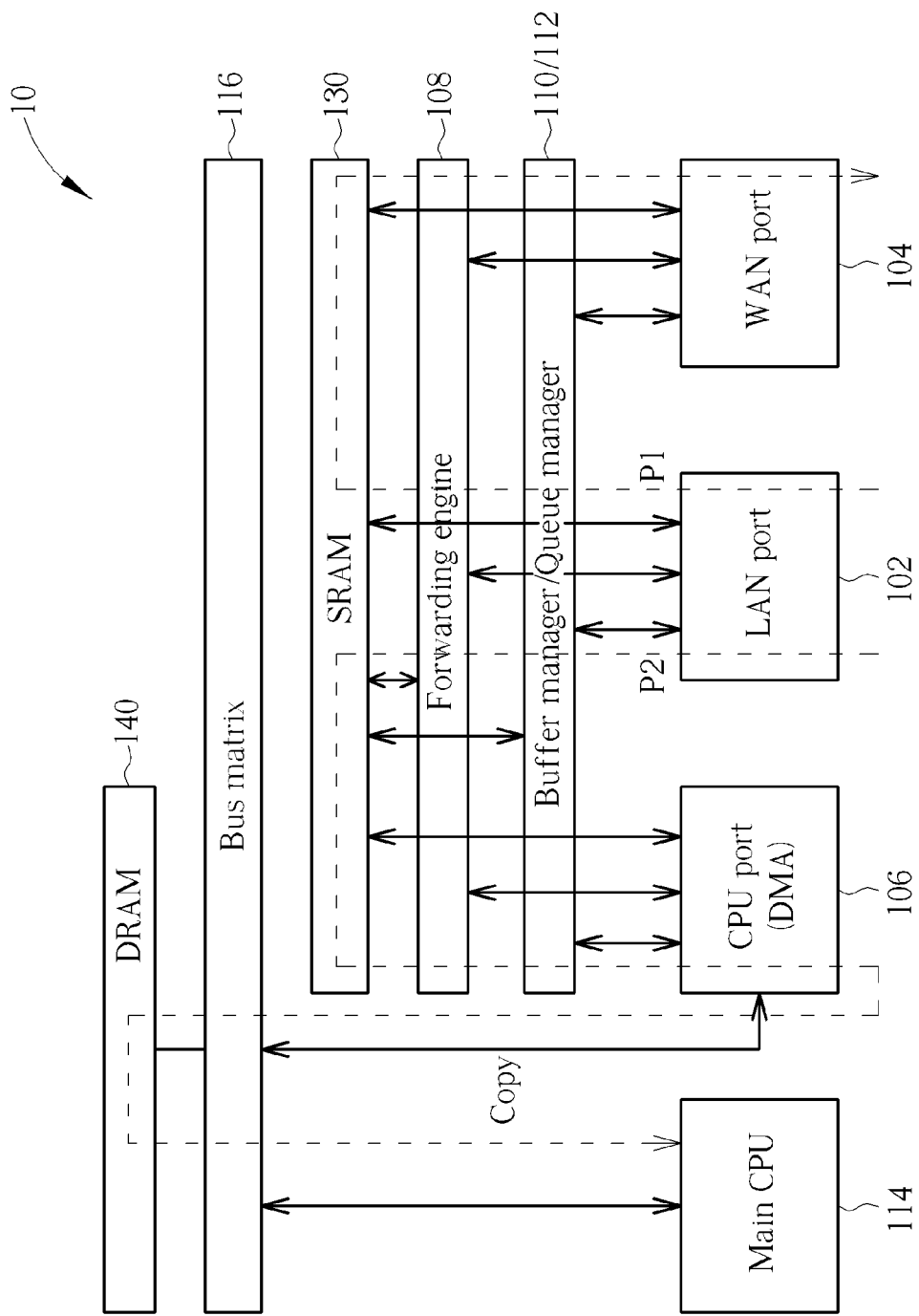
FIG. 1 is a schematic diagram of a network switching system.

Please refer to FIG. 1, which is a schematic diagram of a network switching system 10. As shown in FIG. 1, the network switching system 10 includes a local area network (LAN) port 102, a wide area network (WAN) port 104, a central processing unit (CPU) port 106, a forwarding engine 108, a buffer manager 110, a queue manager 112 and a static random access memory (SRAM) 130. The LAN port 102 and the WAN port 104 are exemplary ports, while in other examples, a network switching system may include other types of network ports or offload engines processing offload network services. The CPU port 106 performs the connection between a main CPU 114 and other network ports through a bus matrix 116 and a dynamic random access memory (DRAM) 140 by using direct memory access (DMA). The forwarding engine 108 is utilized for realizing forwarding decision by obtaining a destination port and a destination queue for each packet. The buffer manager 110 is utilized for managing the SRAM 130. The queue manager 112 is utilized for managing a plurality of queues of the network ports. The SRAM 130 is utilized for storing packets required to be transmitted via the network switching system 10. At the CPU side, the bus matrix 116 represents communication architecture between the main CPU 114 and corresponding peripherals, and the DRAM 140 is utilized for storing packets switched between the main CPU 114 and the peripherals.

In detail, when a packet P1 enters the network switching system 10 and is required to be transmitted from the LAN port 102 to the WAN port 104, the forwarding engine 108 first looks up header information of the packet P1 to obtain the destination queue and the destination port (i.e. the WAN port 104) of the packet P1. The LAN port 102 requests a free buffer space from the SRAM 130, and the packet P1 is stored in this buffer space. The LAN port 102 then informs the queue manager 112 the packet P1 should be transmitted to the destination queue of the WAN port 104 according to the header information. The queue manager 112 then enqueues the packet P1 to the destination queue of the WAN port 104. After receiving the queuing status of the packet P1 from the queue manager 112, the WAN port 104 dequeues and reads out the packet P1. The WAN port 104 then sends the packet P1 out and releases the buffer space. As a result, the packet switching process is completed.

Please keep referring to FIG. 1. If a packet P2 needs to be transmitted to the main CPU 114, the packet P2 should be managed by the CPU port 106 using DMA. As shown in FIG. 1, after the packet P2 is transmitted from the LAN port 102 to the CPU port 106, the packet P2 is then copied to the DRAM 140 by using DMA, where the DRAM 140 is managed by the main CPU 114. As a result, the packet P2 can be processed by the main CPU 114.

Figure 2:
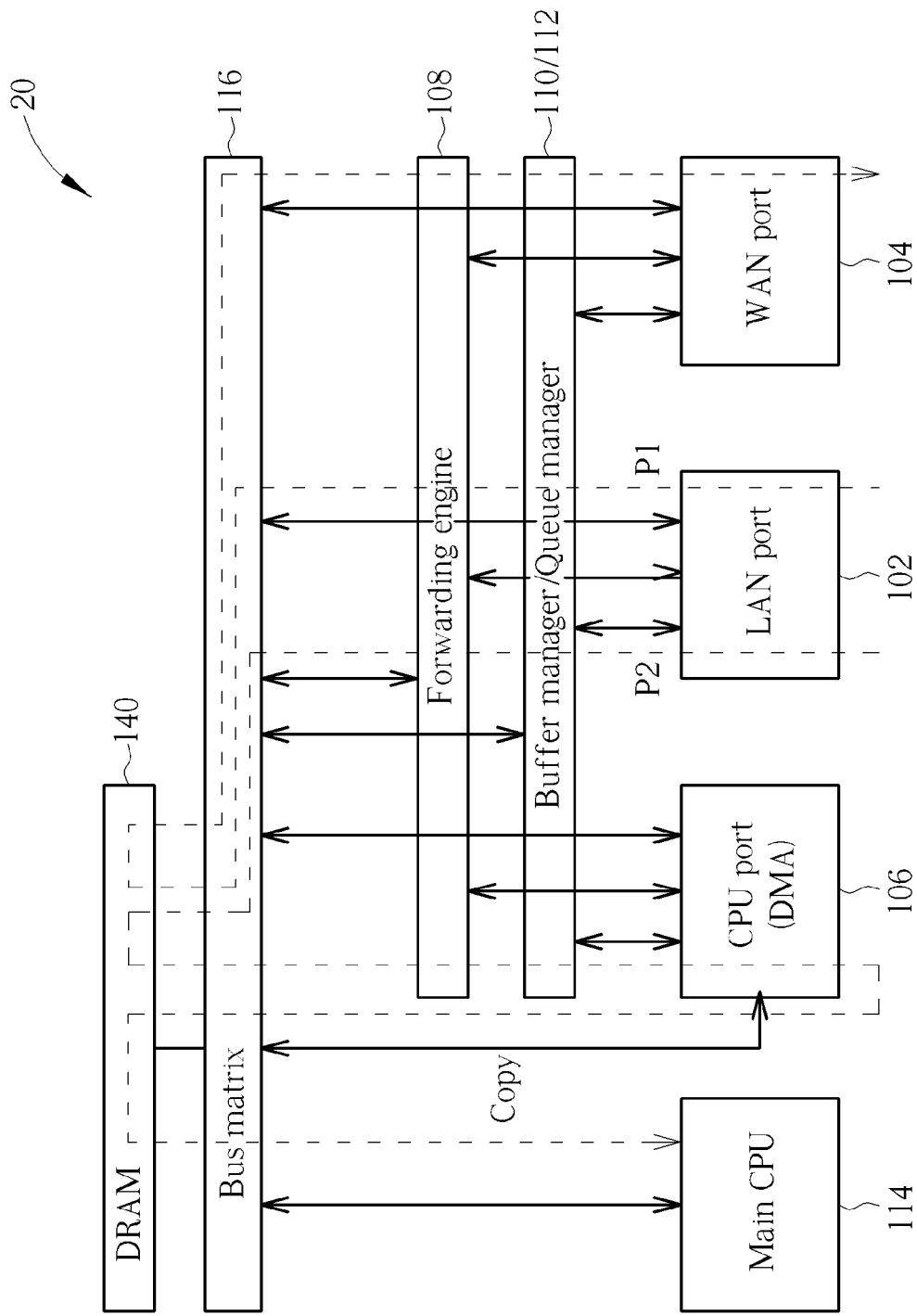
FIG. 2 is a schematic diagram of another network switching system.

However, the packet P2 is stored in the SRAM 130 and then copied to the DRAM 140 through the CPU port 106 by using DMA, which is inefficient for the network switching system 10. Besides, the buffer space of the SRAM 130 is small, which may cause packet loss more probably when the traffic of the network switching system 10 is congested. Therefore, the structure of the network switching system 10 can be modified to overcome these drawbacks. For example, please refer to FIG. 2, which is a schematic diagram of another network switching system 20. As shown in FIG. 2, the structure of the network switching system 20 is similar to that of the network switching system 10; hence elements and signals with similar functions are denoted by the same symbols. The main difference between the network switching system 20 and the network switching system 10 is that the network switching system 20 excludes the SRAM 130. In such a condition, the LAN port 102, the WAN port 104 and the CPU port 106 directly access the DRAM 140 via the bus matrix 116. In other words, the memory functions of the network switching system 20 are all performed by the DRAM 140, which is much larger than the SRAM 130 and may possess more buffer space for storing the packets when the traffic of the network switching system 20 is congested, such that the probability of packet loss can be reduced.

Figure 3:
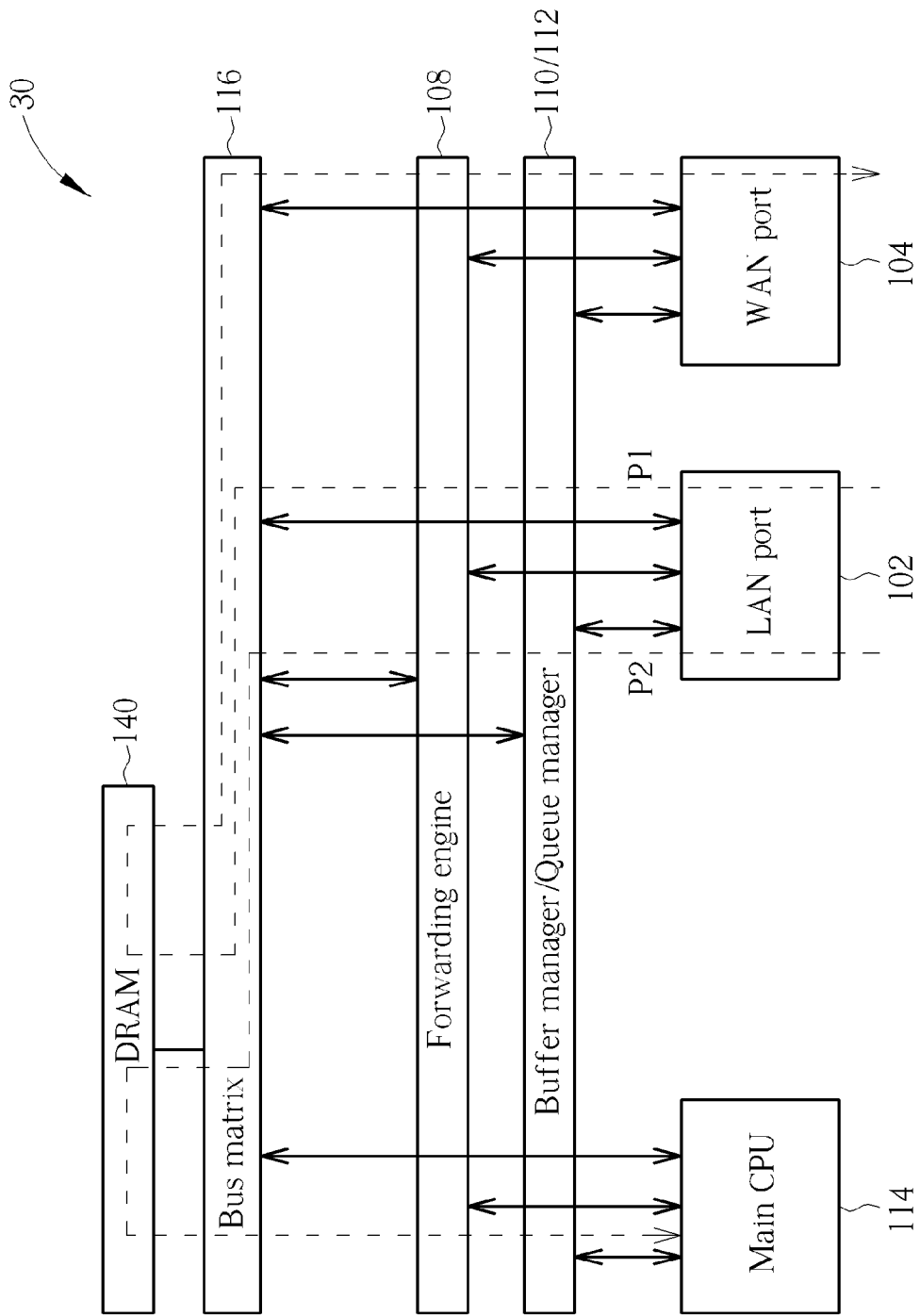
FIG. 3 is a schematic diagram of a further network switching system.

However, the network switching system 20 still suffers from the problem of inefficiency, i.e. the buffer manager 110 accesses the DRAM 140 first and then the CPU port 106 accesses the DRAM 140 again (the packet is stored to the DRAM 140 twice). Besides, the DRAM 140 is shared by the main CPU 114 and the network switching system 20, which may cause the bandwidth of the DRAM 140 to be occupied with packet switching of the network switching system 20 when traffic load of the network switching system 20 is heavy, such that performance of the main CPU 114 may be reduced. Therefore, further modifications can be performed. Please refer to FIG. 3, which is a schematic diagram of a network switching system 30. As shown in FIG. 3, the structure of the network switching system 30 is similar to that of the network switching system 20; hence elements and signals with similar functions are denoted by the same symbols. The main difference between the network switching system 30 and the network switching system 20 is that the network switching system 30 excludes the CPU port 106. In such a condition, the packet P2 does not need to be stored in the DRAM 140 twice, such that the efficiency can be enhanced. However, the DRAM 140 is still shared by the main CPU 114 and the network switching system 20; hence the bandwidth of the DRAM 140 is still occupied with packet switching when traffic load of the network switching system 20 is heavy.

In order to solve the above problems, the present invention discloses a network switching system different from the abovementioned ones.

Figure 4:
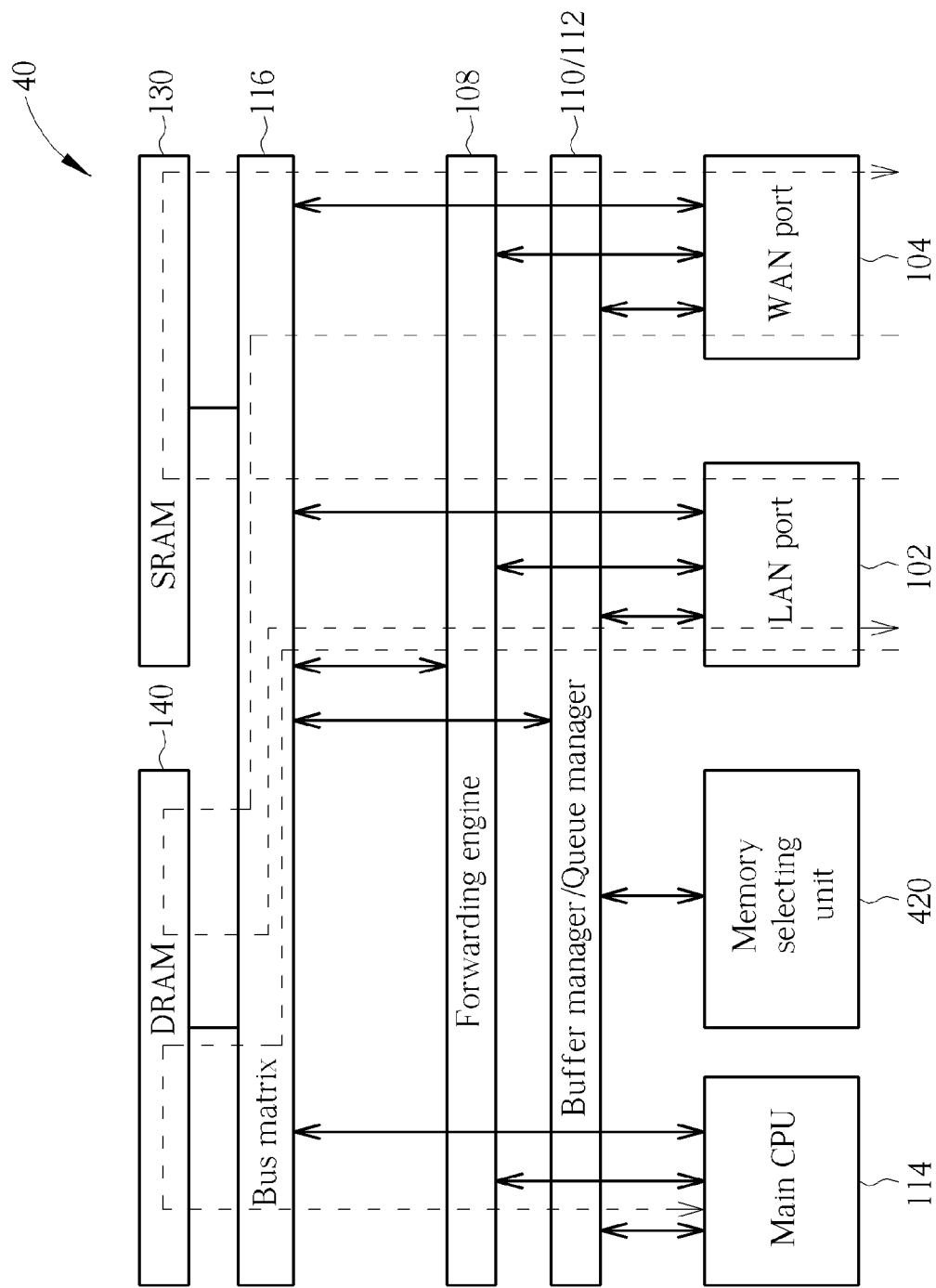
FIG. 4 is a schematic diagram of a network switching system according to an example of the present invention.

Please refer to FIG. 4, which is a schematic diagram of a network switching system 40 according to an example of the present invention. As shown in FIG. 4, elements and signals with similar functions are denoted by the same symbols. The network switching system 40 includes a memory selecting unit 420 for selecting the SRAM 130 or the DRAM 140 for storing each of the packets required to be transmitted according to whether the traffic of the network switching system 40 is congested. Based on a forwarding policy, the network switching system 40 also possesses higher efficiency (without packets being stored twice). In addition, the memory selecting unit 420 is utilized for selecting a designated memory for each packet according to the congestion status of the network switching system 40, which solves the problem that the performance of the main CPU 114 is reduced since the bandwidth of the DRAM 140 is always occupied with packet switching.

Figure 5:
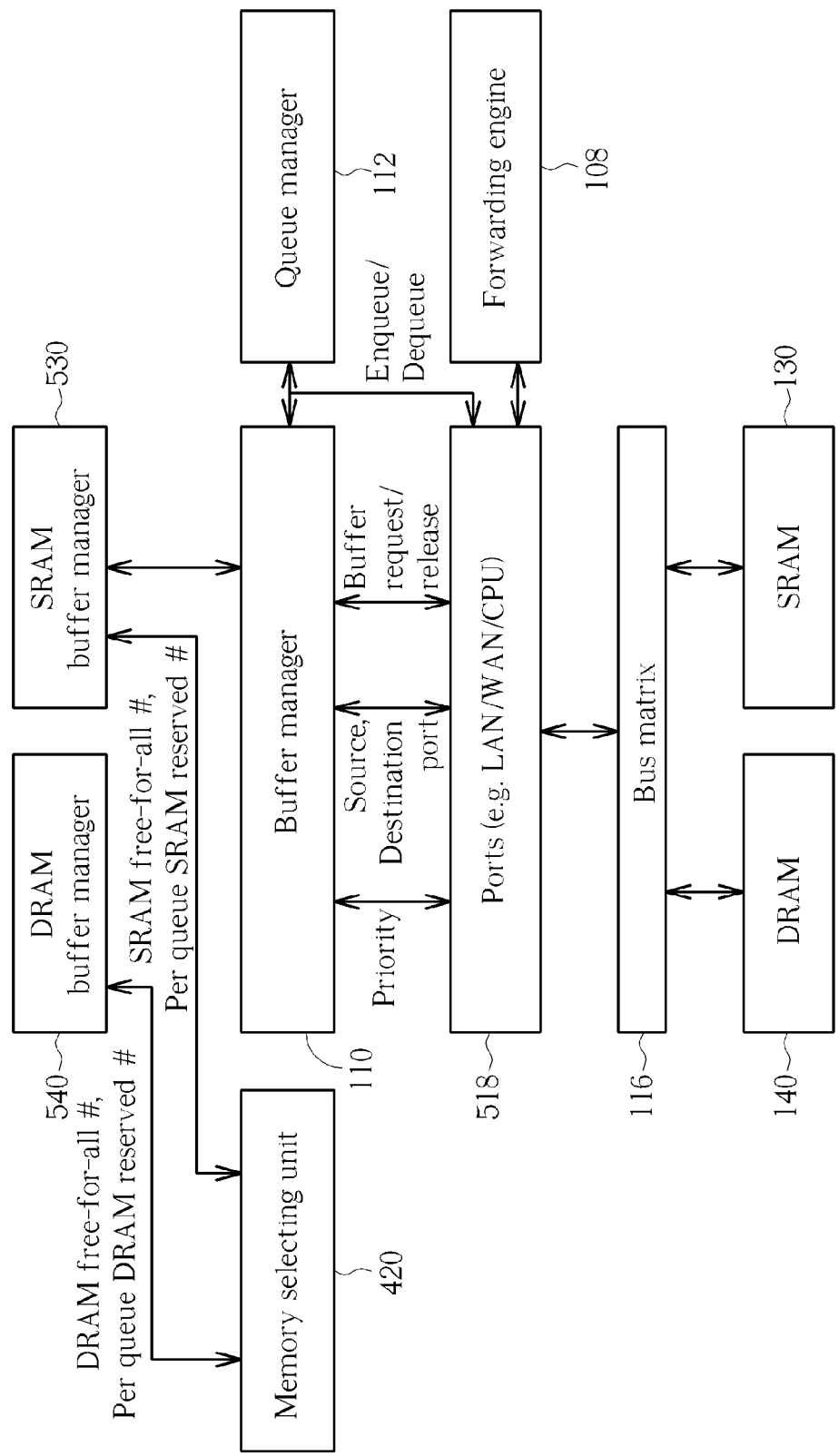
FIG. 5 is a schematic diagram illustrating a detailed structure of the network switching system.

In detail, please refer to FIG. 5, which is a schematic diagram illustrating a detailed structure of the network switching system 40. As shown in FIG. 5, all of the network ports (e.g. the LAN port 102, the WAN port 104, and the CPU port 106) are aggregated as ports 518 for simplification. In other examples, the ports 518 may include other types of network ports such as Ethernet, digital subscriber line (xDSL), 3G/3.5G, etc. In addition, offload network services with offload engines such as crypto engine, content scan engine, Peripheral Component Interconnect Express (PCIe) host, Universal Serial Bus (USB) host, WiFi network interface controllers (NICs) and 3G/LTE NICs, etc. may also be included in the ports 518. The buffer manager 110 further includes an SRAM buffer manager 530 and a DRAM buffer manager 540, which manages the free buffer space of the SRAM 130 and the DRAM 140, respectively.

When a packet is required to be transmitted from one port (i.e. a source port) to another port (i.e. a destination port), the forwarding engine 108 retrieves information related to the source port, the destination port and priority of the packet, and provides the information for the buffer manager 110. The source port then requires a buffer space from the buffer manager 110. The memory selecting unit 420 obtains the information related to the destination port and priority, and commands the buffer manager 110 to assign the buffer space from the SRAM 130 or the DRAM 140 according to a congestion status of the destination queue of the packet, wherein the destination queue may correspond to the priority information of the packet. The memory selecting unit 420 further communicates with the SRAM buffer manager 530 and the DRAM buffer manager 540, in order to obtain information related to free buffer space in the SRAM 130 and the DRAM 140, respectively. After the buffer space is assigned for the packet, the packet is stored in the buffer space. The queue manager 112 then enqueues the packet to the destination queue. Finally, the destination port receives the queuing status of the packet from the queue manager 112 and dequeues the packet. The destination port then sends the packet out and releases the buffer space to the buffer manager 110. Therefore, the packet switching process is completed.

Please note that, the network switching system 40 may include two types of memories: SRAM and DRAM, and the memory selecting unit 420 is utilized for selecting one of the two types of memories for storing each packet to be switched in the network switching system 40 according to a congestion status of the network switching system 40, and more specifically, to a congestion status of the destination queue of each packet. Among these two memories, the SRAM has advantages of high accessing speed and low power consumption, and is easily embedded in system on chip (SOC). On the other hand, the DRAM usually has much larger buffer space than the SRAM, such that probability of packet loss can be reduced by utilizing the DRAM. In general, in the network switching system 40, a packet is stored in the DRAM 140 when the destination queue of the packet is congested; hence the DRAM 140 with a larger buffer space may prevent the packet from being easily lost. A packet is stored in the SRAM 130 when the destination queue of the packet is not congested; hence the packet switching can be performed with higher speed and lower power consumption. Besides, in this situation, the bandwidth of the DRAM 140 will not be occupied by packet switching and can be saved for the main CPU 114, such that the performance of the main CPU 114 can also be enhanced. As a result, the network switching system 40 has better performance than conventional network switching systems with SRAM only, e.g. the network switching system 10, which may suffer from packet loss more probably. The network switching system 40 also has better performance than other convention network switching systems with DRAM only, e.g. the network switching system 20 or the network switching system 30, in which the performance of the main CPU 114 is easily interfered by packet switching when the traffic load of the network switching system is heavy and the bandwidth of the DRAM 130 is occupied by packet switching. Besides, the network switching system 40 possesses higher speed and lower power consumption than those network switching systems with DRAM only.

Figure 6A:
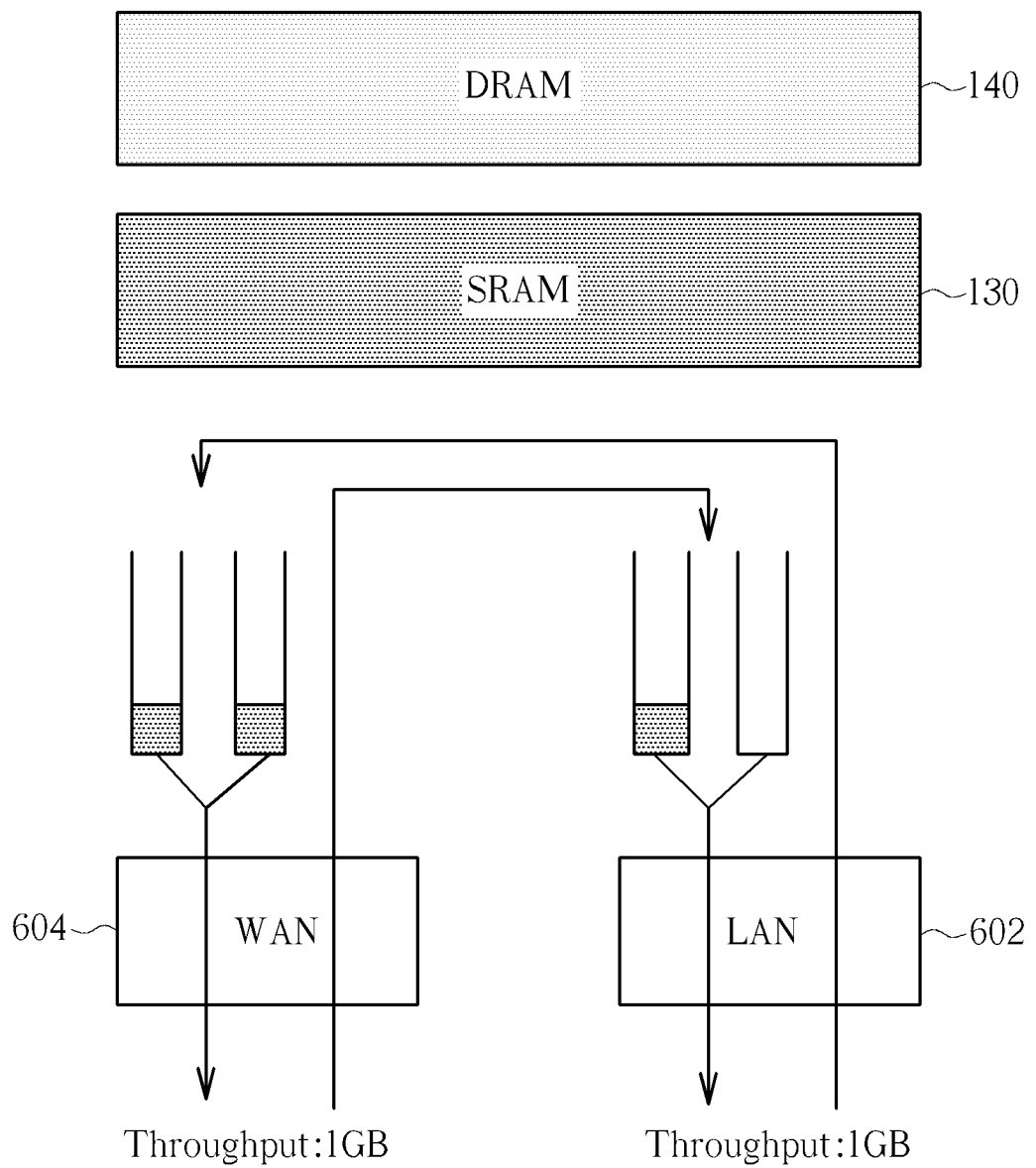
FIG. 6A and FIG. 6B are schematic diagrams of packet switching between two network ports with memory selection according to an example of the present invention.

As can be seen, the SRAM 130 is utilized for storing the packets when the traffic of the network switching system 40 is not congested, and the DRAM 140 is utilized for storing the packets when the traffic of the network switching system 40 is congested. Therefore, the congestion status of each queue should be determined in order to determine which memory should be used for each packet. For example, the traffic load of each queue may be considered as a basis of the congestion status. Please refer to FIG. 6A and FIG. 6B, which are schematic diagrams of packet switching between two network ports with memory selection according to an example of the present invention. As shown in FIG. 6A, packet switching is performed between a LAN port 602 and a WAN port 604. Suppose that the LAN port 602 and the WAN port 604 both can reach throughput of 1 GB. In such a condition, since the throughputs of the LAN port 602 and the WAN port 604 are equal, the packets transmitted from the WAN port 604 can be sent to the LAN port 602 without any congestion occurs in the LAN port 602, and the packets transmitted from the LAN port 602 can also be sent to the WAN port 604 without any congestion occurs in the WAN port 604. Therefore, the SRAM 130 is utilized for storing packets, which possesses the benefits of higher accessing speed, lower access latency and lower power consumption, in order to achieve higher performance. Besides, the high throughputs of 1 GB from the LAN port 602 and from the WAN port 604 (total 2 GB throughput) will not occupy the bandwidth of the DRAM 140, such that the performance of the main CPU will not be interfered.

Figure 6B:
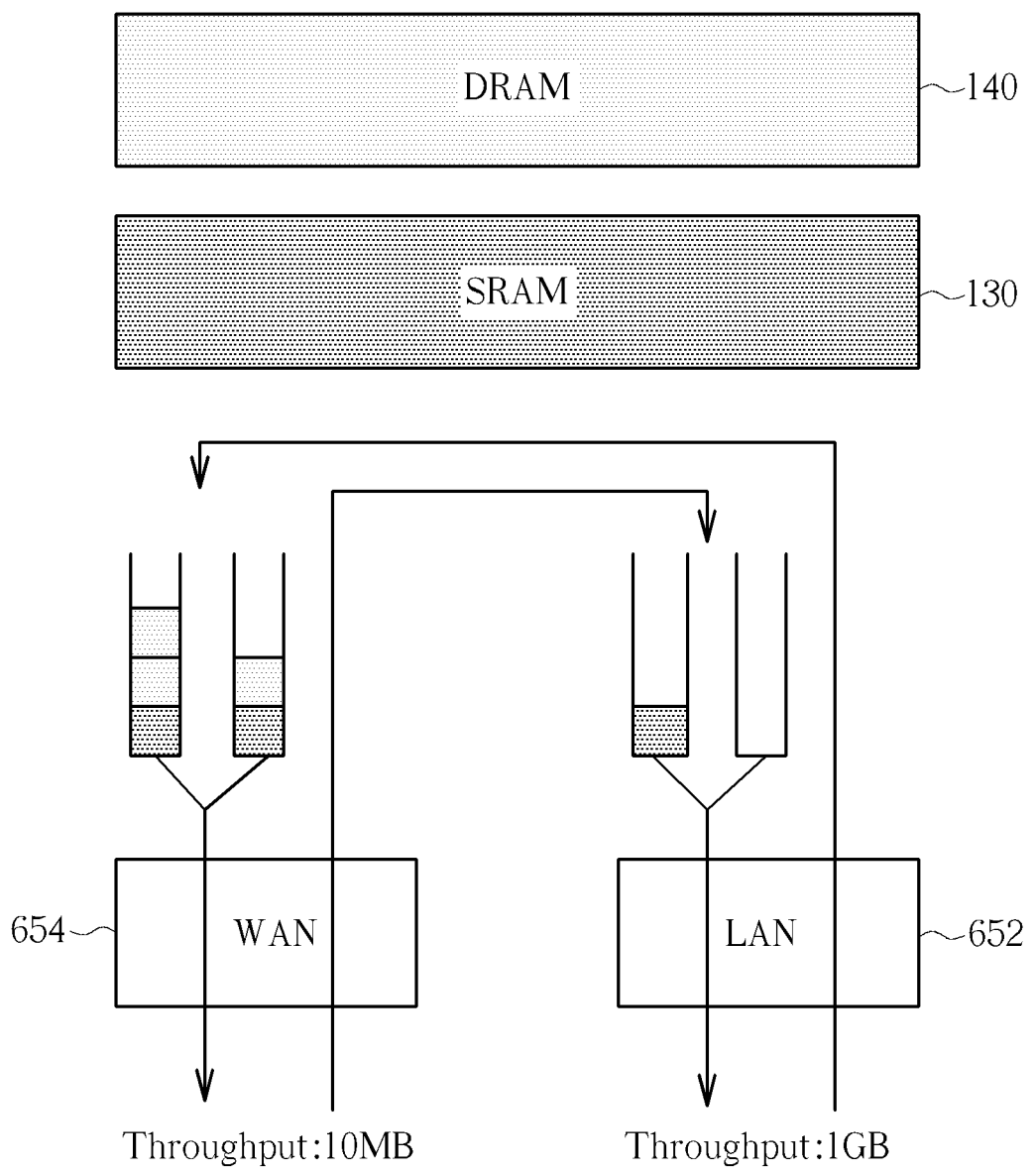

As shown in FIG. 6B, packet switching is performed between another LAN port 652 and another WAN port 654. Suppose that the LAN port 652 can reach throughput of 1 GB and the WAN port 654 can reach throughput of 10 MB. In such a condition, since the throughput of the LAN port 652 is much greater than that of the WAN port 654, the packets transmitted from the WAN port 654 can be sent to the LAN port 652 without any congestion occurs in the LAN port 652, but the packets transmitted from the LAN port 652 to the WAN port 654 may be congested in the queues of the WAN port 654. Therefore, for storing the packets from the WAN port 654 to the LAN port 652, the SRAM is utilized, which also possesses the benefits of higher accessing speed and lower power consumption, in order to achieve higher performance. On the other hand, for storing the packets from the LAN port 652 to the congested queues in the WAN port 654, the DRAM should be utilized in order to avoid packet loss. As shown in FIG. 6B, the previous packets are still stored in the SRAM 130 since the congestion has not occurred or the congestion is slight when the transmission starts. After more packets wait in the queues of the WAN port 654, the DRAM 140 starts to be selected for packet storage.

In the above examples, the memory selecting unit 420 determines the congestion status of the network switching system 40 and commands the buffer manager 110 to select the SRAM 130 or the DRAM 140 accordingly. In general, when the network switching system 40 is congested, the DRAM 140 is selected, while when the network switching system 40 is not congested, the SRAM 130 is selected. In such a condition, different methods can be implemented for determining the congestion status. For example, the congestion status may be determined according to whether there is still free buffer space in the SRAM 130. If there is still free buffer space in the SRAM 130, the network switching system 40 may be considered not congested and the SRAM 130 is selected; if there is no free buffer space in the SRAM 130, the network switching system 40 may be considered congested and the DRAM 140 is selected. Such a method is simple and makes the SRAM 130 fully utilized. However, this method may suffer from poor equality and bad QoS for different users of the network switching system 40. For example, when a user transmits a large quantity of packets to the network switching system 40 and the destination queue of the packets is congested, the user may occupy all bandwidth of the SRAM 130. If other users need to transmit packets at this moment, they should use the DRAM 140 and face a slower accessing speed.

Therefore, other methods can be performed for determining the congestion status of the network switching system 40 with the consideration of equality and efficiency. In some examples, the buffer space in the SRAM 130 or the DRAM 140 can be classified into two types: free-for-all buffer space and reserved buffer space. The free-for-all buffer space can be accessed by all queues of all network ports of the network switching system 40, and the reserved buffer space is reserved for a specific queue and can only be accessed by the specific queue; that is, only the packets enqueued in the specific queue can be stored in the corresponding reserved buffer space. For example, supposing that a network switching system has 10 queues and 1000 units of SRAM buffer space, the 1000-unit SRAM buffer space can be classified into 500 units of free-for-all buffer space and 500 units of reserved buffer space, and each of the 10 queues can be corresponding to 50 units of reserved buffer space. Certainly, other classification methods can be applied, or each of the queues may be reserved with different units of reserved buffer space according to QoS policy, which is not limited herein.

In the above example, each queue is authorized to access 500 units of free-for-all buffer spaces and 50 units of reserved buffer spaces in the SRAM. In such a situation, when a packet arrives, a specific queue Qi accesses the free-for-all buffer space first, and then accesses the reserved buffer space after the free-for-all buffer space is used up. After all of the accessible SRAM buffer spaces (i.e. 550 units of buffer space) are used up, the queue Qi is considered congested and starts to access the DRAM.

The abovementioned selection policy can be summarized into a table shown in FIG. 7. As shown in FIG. 7, the buffer spaces in both SRAM and DRAM are classified into free-for-all buffer spaces (FFA) and reserved buffer spaces (Resv). When a packet needs to be transmitted to the queue Qi, the queue Qi accesses the free-for-all buffer space in the SRAM for storing the packet if there is free-for-all buffer space in the SRAM (Policy sequence 1). If the free-for-all buffer space in the SRAM is used up, the queue Qi accesses the buffer space reserved for the queue Qi if there is reserved buffer space for the queue Qi in the SRAM (Policy sequence 2). If all of the accessible SRAM buffer spaces are used up, the queue Qi accesses the free-for-all buffer space in the DRAM for storing the packet if there is free-for-all buffer space in the DRAM (Policy sequence 3). If the free-for-all buffer space in the DRAM is used up, the queue Qi accesses the buffer space reserved for the queue Qi if there is reserved buffer space for the queue Qi in the DRAM (Policy sequence 4). If all of the accessible SRAM buffer spaces and DRAM buffer spaces are used up, the queue Qi is paused (Policy sequence 5), which means that the queue Qi is full of packets, and each new packet required to be sent to the queue Qi must be lost.

Note that, the present invention provides a network processor and method capable of storing a packet to a designated memory according to a congestion status of a network switching system, and those skilled in the art can make modifications and alternations accordingly. For example, the selecting method is not limited to the abovementioned selection policy; in other examples, other selection policy can be applied, e.g. changing the priority of the free-for-all buffer space and the reserved buffer space, which is not limited herein. In addition, the memories used in the network switching system should not be limited to SRAM and DRAM, and other types of memories may also be utilized. Furthermore, the above examples only specify the network ports such as the LAN port, the WAN port and the CPU port, but other types of network ports and offload engines may also be included in the network switching system. These modifications are detailed as follows.

As shown in the above, the network switching system 40 utilizes a proper memory for storing the packet, in order to enhance the performance of packet switching. In such a condition, as long as a memory selecting unit performs a proper selection between at least two memories with different attributes according to the congestion status of the network switching system, any types of memories may be utilized for storing packets. These memories includes, but are not limited to, random access memories (RAM) such as SRAM, DRAM, magnetic RAM (MRAM) or any other types of RAM, read-only memories (ROM) such as programmable ROM (PROM), erasable PROM (EPROM), electrically EPROM (EEPROM) or any other types of ROM, or other types of memories.

The attributes of the included memories should be different to some extent, which establishes distinction between different memories for the memory selecting unit. For example, the SRAM 130 and the DRAM 140 are different in the attributes that the SRAM 130 has a smaller size (i.e. smaller buffer space) but the DRAM 140 has a larger size (i.e. larger buffer space); the SRAM 130 has a higher accessing speed but the DRAM 140 has a lower accessing speed; the SRAM 130 has lower power consumption but the DRAM 140 has higher power consumption; the SRAM 130 can easily be embedded in system on chip (SOC) but the DRAM 140 cannot; the SRAM 130 is a static memory but the DRAM 140 is a dynamic memory. Therefore, the memory selecting unit can select a proper memory at a suitable time based on the distinction of the attributes.

Figure 8:
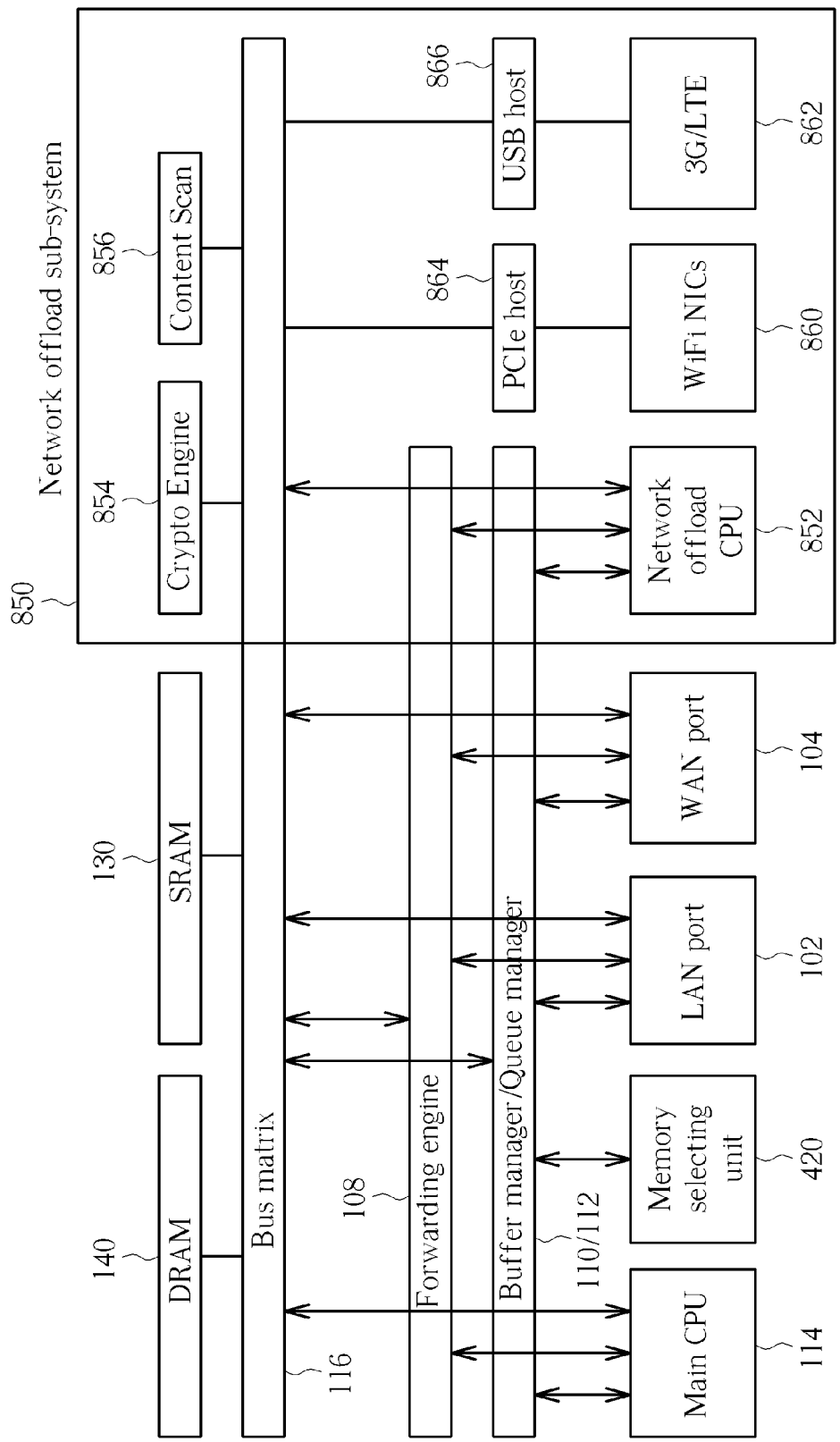
FIG. 8 is a schematic diagram of a network switching system according to an example of the present invention.

Please refer to FIG. 8, which is a schematic diagram of a network switching system 80 according to an example of the present invention. As shown in FIG. 8, the structure of the network switching system 80 is similar to that of the network switching system 40; hence elements and signals with similar functions are denoted by the same symbols. The main difference between the network switching system 80 and the network switching system 40 is that the network switching system 80 further includes a network offload sub-system 850. The network offload sub-system 850 includes a network offload CPU 852, a crypto engine 854, a content scan engine 856, WiFi NICs 860, 3G/LTE NICs 862, a PCIe host 864 and a USB host 866.

In detail, in the network offload sub-system 850, the network offload CPU 852 is implemented together with corresponding offload engines (e.g. the crypto engine 854 and the content scan engine 856), in order to accelerate related network services. The crypto engine 854 provides functions related to encryption and decryption for important data. The content scan engine 856 provides functions related to virus scanning or string scanning. The offload CPU 852, which is distinct from the main CPU 114, is utilized for managing the offload functions of these offload engines. These complex network services are offloaded by using the network offload CPU 852 via a connection interface implemented by the bus matrix 116, in order to build the network offload sub-system 850. In addition, packet switching with complex formats of WiFi NICs and 3G/LTE NICs are performed by dedicated CPUs, such that these network ports can communicate with the network switching system 80 via the PCIe host 864 interface and the USB host 866 interface, respectively; hence the complex packet switching of these network systems can also be performed in the network switching system 80. The network offload sub-system 850 including these offload engines and complex network systems is then combined with the network switching system 40 to build the network switching system 80, which is capable of using the SRAM 130 and the DRAM 140 according to the congestion status, and includes both the benefits of the SRAM 130 and the DRAM 140.

Figure 9:
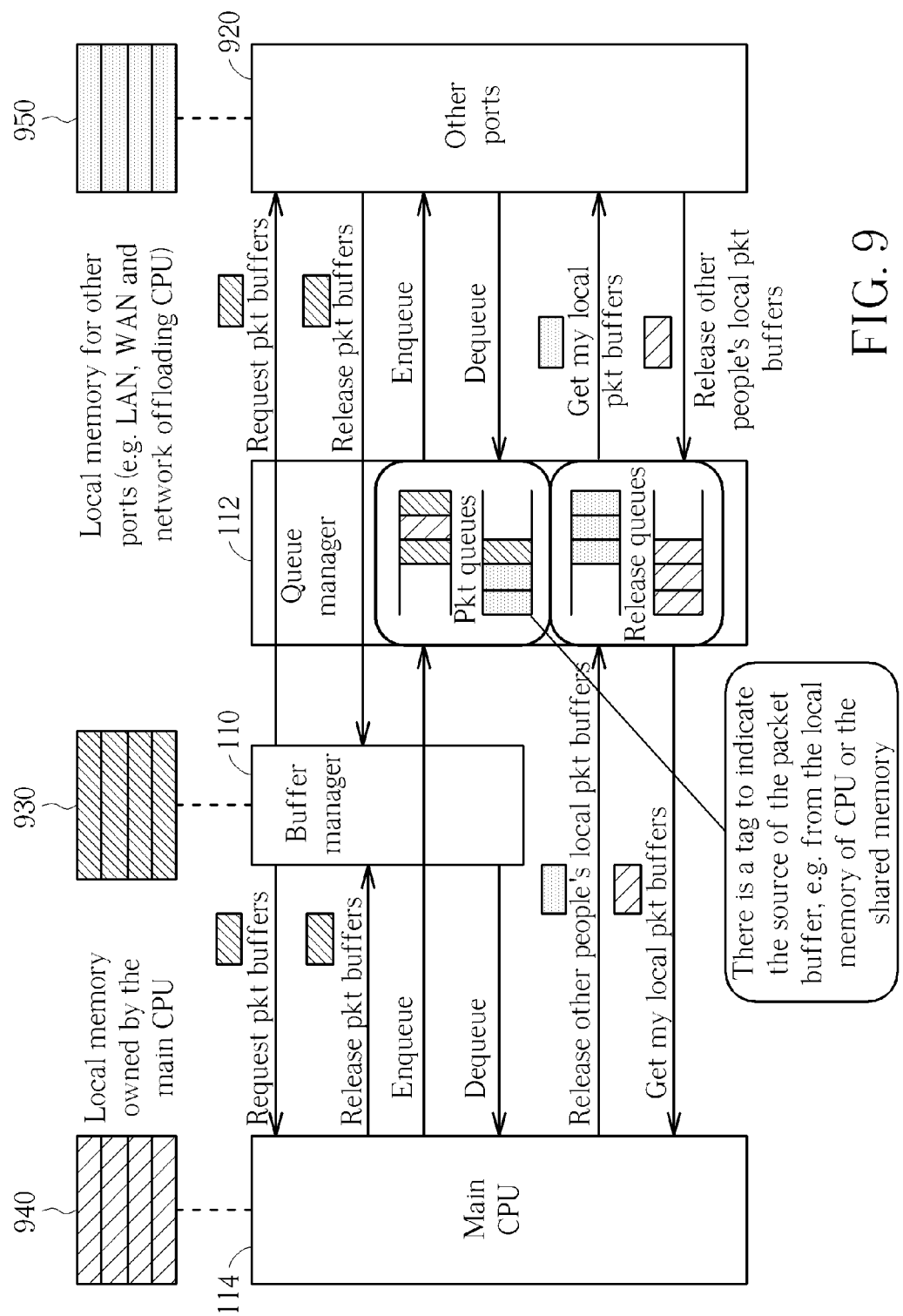
FIG. 9 is a schematic diagram of a network switching system with network ports having local memories according to an example of the present invention.

Please refer to FIG. 9, which is a schematic diagram of a network switching system 90 with network ports having local memories according to an example of the present invention. As shown in FIG. 9, functions of the buffer manager, the queue manager and the main CPU in the network switching system 90 are similar to those in the network switching system 40; hence these elements are denoted by the same symbols. The network ports include a main CPU 114 and other ports 920 referring to the network ports other than the CPU port in general. In some examples, the network ports further include network offload engines. The network switching system 90 includes a central memory 930, which includes SRAM and DRAM and is managed by the buffer manager 110. The main difference between the network switching system 90 and the abovementioned network switching systems is that each of the network ports (i.e. the main CPU 114 and the other ports 920) has a local memory. In the network switching system 90, packet switching without copy can be realized, since the queue manager 112 performs not only enqueuing and dequeuing of the packets stored in the central memory 930, but also obtaining and releasing of the local memories 940, 950 in which packets are stored. Therefore, the packets need not to be copied to the central memory 930 if stored in the local memory 940 or 950.

Therefore, when a packet is required to be transmitted, the buffer manager 110 selects a buffer space from the SRAM or the DRAM for storing the packet according to whether the traffic of the network switching system 90 is congested. In addition, the local memory may also be selected for storing packets, wherein each of the local memory may also have both SRAM and DRAM, such that a proper memory can be selected according to the congestion status of the network switching system 90. In other words, no matter whether the central memory 930 or the local memories 940, 950 are utilized for storing packets, the proper type of memory (SRAM or DRAM) can be selected, such that the network switching system 90 can have both of the benefits of DRAM and SRAM.

In some examples, the memory selecting unit together with memories having different attributes may be implemented in the systems having main CPU and corresponding DMA port, e.g. the network switching systems 10 and 20, as long as the memory is selected by the memory selecting unit for storing packets according to whether the traffic of the network switching system is congested, such that the network switching system can have both of the benefits of DRAM and SRAM. Please note that, the memories and corresponding buffer space in the examples of the present invention are dedicated for storing packets which is required to be transmitted in the network switching system, which should be distinct from CPU buffers or other buffering systems. For example, in some storage systems with buffer space, data may be buffered in the buffer space (e.g. SRAM) and then enter the storage system (e.g. DRAM), which cannot have both of the benefits of SRAM and DRAM for packet switching, and should be distinct from the present invention.

In the prior art, for packet switching between the heterogeneous network services and various network ports, the conventional network switching system can not perform packet switching efficiently and completely due to inherent limitation of the memories used in the network switching system, especially when the traffic of the network switching system is congested. In comparison, the present invention is capable of storing a packet to a designated memory according to a congestion status of a network switching system, which has benefits of different memories utilized in the network system. For example, the network switching system uses DRAM when the traffic is congested, such that the probability of packet loss can be reduced. On the other hand, the network switching system uses SRAM when the traffic is not congested, such that the performance of the network switching system is enhanced with higher accessing speed and lower power consumption. In addition, performance of the CPU may not easily be interfered by packet switching.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network switching system for processing packet switching, comprising:
   a first memory, for storing a first packet among a plurality of packets;
   a second memory, for storing a second packet among the plurality of packets;
   a memory selecting unit, for selecting the first memory or the second memory for storing each of the plurality of packets according to whether a traffic of the network switching system is congested;
   a buffer manager, for managing the first memory and the second memory;
   a queue manager, for managing a plurality of queues of a plurality of network ports; and
   a forwarding engine, for obtaining a destination queue of a destination network port among the plurality of network ports for each of the plurality of packets;
   wherein attributes of the first memory and the second memory are different.

2. The network switching system of claim 1, wherein the memory selecting unit selects the first memory or the second memory for storing each of the plurality of packets according to a congestion status of the destination queue of the destination network port.

3. The network switching system of claim 1, wherein the buffer manager comprises:
   a first memory buffer manager, for providing information of a first free buffer in the first memory for the memory selecting unit; and
   a second memory buffer manager, for providing information of a second free buffer in the second memory for the memory selecting unit.

4. The network switching system of claim 1, wherein in the first memory or the second memory, a third buffer is reserved for a specific queue among the plurality of queues for packet switching, and a fourth buffer is available for all of the plurality of queues for packet switching.

5. The network switching system of claim 4, wherein when the third buffer and the fourth buffer are both free, the third buffer has a higher priority than the fourth buffer for storing packets sent to the specific queue among the plurality of queues.

6. The network switching system of claim 1, wherein the first memory is a static random access memory (SRAM) and is utilized for storing the plurality of packets when the traffic of the network switching system is not congested, and the second memory is a dynamic random access memory (DRAM) and is utilized for storing the plurality of packets when the traffic of the network switching system is congested.

7. A network switching system, comprising:
   a plurality of network ports, each network port comprising a plurality of queues;
   a first memory, for storing a first packet among a plurality of packets;
   a second memory, for storing a second packet among the plurality of packets; and
   a memory selecting unit, for selecting the first memory or the second memory for storing each of the plurality of packets according to whether a traffic of the network switching system is congested;
   a buffer manager, for managing the first memory and the second memory;
   a queue manager, for managing the plurality of queues of the plurality of network ports; and
   a forwarding engine, for obtaining a destination queue of a destination network port among the plurality of network ports for each of the plurality of packets;
   wherein attributes of the first memory and the second memory are different.

8. The network switching system of claim 7, wherein the memory selecting unit selects the first memory or the second memory for storing each of the plurality of packets according to a congestion status of the destination queue of the destination network port.

9. The network switching system of claim 7, wherein the buffer manager comprises:

a first memory buffer manager, for providing information of a first free buffer in the first memory for the memory selecting unit; and a second memory buffer manager, for providing information of a second free buffer in the second memory for the memory selecting unit.

10. The network switching system of claim 7, wherein in the first memory or the second memory, a third buffer is reserved for a specific queue among the plurality of queues for packet switching, and a fourth buffer is available for all of the plurality of queues for packet switching.

11. The network switching system of claim 10, wherein when the third buffer and the fourth buffer are both free, the third buffer has a higher priority than the fourth buffer for storing packets sent to the specific queue among the plurality of queues.

12. The network switching system of claim 7, wherein the first memory is a static random access memory (SRAM) and is utilized for storing the plurality of packets when the traffic of the network switching system is not congested, and the second memory is a dynamic random access memory (DRAM) and is utilized for storing the plurality of packets when the traffic of the network switching system is congested.

13. A method of processing packet switching in a network switching system, the network switching system comprising a first memory and a second memory, the method comprising:
    selecting the first memory or the second memory for storing each of a plurality of packets according to whether a traffic of the network switching system is congested; and
    obtaining a destination queue of a destination network port among a plurality of network ports for each of the plurality of packets;
wherein attributes of the first memory and the second memory are different.

14. The method of claim 13, wherein the step of selecting the first memory or the second memory for storing each of the plurality of packets according to whether the traffic of the network switching system is congested comprises:
    selecting the first memory or the second memory for storing each of the plurality of packets according to a congestion status of the destination queue of the destination network port.

15. The method of claim 13, further comprising:
    providing information of a first free buffer in the first memory; and
    providing information of a second free buffer in the second memory.

16. The method of claim 13, wherein in the first memory or the second memory, a third buffer is reserved for a specific queue among the plurality of queues for packet switching, and a fourth buffer is available for all of a plurality of queues for packet switching.

17. The method of claim 16, wherein when the third buffer and the fourth buffer are both free, the third buffer has a higher priority than the fourth buffer for storing packets sent to the specific queue among the plurality of queues.

18. The method of claim 13, further comprising:
    storing the plurality of packets when the traffic of the network switching system is not congested in the first memory, wherein the first memory is a static random access memory (SRAM), and
    storing the plurality of packets when the traffic of the network switching system is congested in the second memory, wherein the second memory is a dynamic random access memory (DRAM).

* * * * *